(12) United States Patent
Dierksmeier

(10) Patent No.: US 10,704,408 B2
(45) Date of Patent: Jul. 7, 2020

(54) DUAL RESPONSE BLADE TRACK SYSTEM

(71) Applicant: Rolls-Royce North American Technologies Inc., Indianapolis, IN (US)

(72) Inventor: Douglas David Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 114 days.

(21) Appl. No.: 15/970,495

(22) Filed: May 3, 2018

(65) Prior Publication Data
US 2019/0338663 A1 Nov. 7, 2019

(51) Int. Cl.
*F01D 11/18* (2006.01)
*F01D 11/24* (2006.01)
*F01D 25/14* (2006.01)

(52) U.S. Cl.
CPC .............. *F01D 11/24* (2013.01); *F01D 11/18* (2013.01); *F01D 25/14* (2013.01); *F05D 2240/11* (2013.01); *F05D 2260/201* (2013.01)

(58) Field of Classification Search
CPC .......... F01D 11/24; F01D 11/18; F01D 25/14; F05D 2240/11
See application file for complete search history.

(56) References Cited

U.S. PATENT DOCUMENTS

| | | | | |
|---|---|---|---|---|
| 3,966,356 A | * | 6/1976 | Irwin | F01D 11/08 415/173.3 |
| 4,317,646 A | * | 3/1982 | Steel | F01D 11/18 415/116 |
| 5,035,573 A | * | 7/1991 | Tseng | F01D 11/22 415/126 |
| 5,049,033 A | * | 9/1991 | Corsmeier | F01D 11/22 415/127 |
| 5,054,997 A | * | 10/1991 | Corsmeier | F01D 11/22 415/126 |
| 5,062,767 A | * | 11/1991 | Worley | F01D 9/042 415/190 |
| 5,092,735 A | | 3/1992 | Katy | |
| 5,096,375 A | * | 3/1992 | Ciokailo | F01D 11/22 415/127 |
| 5,104,287 A | * | 4/1992 | Ciokajlo | F04D 29/526 415/173.2 |

(Continued)

*Primary Examiner* — Moshe Wilensky
*Assistant Examiner* — Theodore C Ribadeneyra
(74) *Attorney, Agent, or Firm* — Brinks Gilson & Lione

(57) ABSTRACT

A blade track system includes an outer ring coupled with a blade track, and an inner ring positioned concentrically between the outer ring and the blade track. The outer ring designed to radially expand, at a first predetermined rate, in response to acceleration of a gas turbine engine. The segments of the blade track radially outwardly expanded away from a hub of the gas turbine engine by the radial expansion of the outer ring. The inner ring designed to radially contract inwardly toward the hub of the gas turbine engine at a second predetermined rate in response to deceleration of the gas turbine. The first predetermined rate being greater than the second predetermined rate, and radial contraction of the outer ring and the segments of the blade track constrained to the predetermined rate of contraction of the inner ring.

20 Claims, 6 Drawing Sheets

(56) References Cited

U.S. PATENT DOCUMENTS

| | | | | |
|---|---|---|---|---|
| 5,228,828 | A * | 7/1993 | Damlis | F01D 11/22 415/173.2 |
| 5,362,202 | A * | 11/1994 | Derouet | F01D 11/22 415/148 |
| 5,545,007 | A * | 8/1996 | Martin | F01D 11/22 415/118 |
| 5,593,277 | A * | 1/1997 | Proctor | F01D 11/18 415/115 |
| 5,601,402 | A * | 2/1997 | Wakeman | F01D 11/22 415/173.1 |
| 5,639,210 | A * | 6/1997 | Carpenter | H01Q 7/00 415/135 |
| 5,871,333 | A | 2/1999 | Halsey | |
| 6,382,905 | B1 * | 5/2002 | Czachor | F01D 11/122 415/9 |
| 6,877,952 | B2 * | 4/2005 | Wilson | F01D 11/18 415/136 |
| 6,896,483 | B2 | 5/2005 | Dierksmeier et al. | |
| 6,935,836 | B2 * | 8/2005 | Ress, Jr. | F01D 11/025 415/173.2 |
| 7,563,071 | B2 * | 7/2009 | Campbell | F01D 9/04 415/173.1 |
| 7,575,409 | B2 | 8/2009 | Dierksmeier et al. | |
| 7,625,169 | B2 * | 12/2009 | Manzoori | F01D 11/22 415/14 |
| 8,256,228 | B2 * | 9/2012 | O'Leary | F01D 11/22 415/116 |
| 8,616,827 | B2 | 12/2013 | O'Leary | |
| 8,734,090 | B2 * | 5/2014 | Lewis | F01D 11/22 415/136 |
| 9,238,970 | B2 * | 1/2016 | Thibodeau | F01D 9/041 |
| 9,447,696 | B2 * | 9/2016 | McCaffrey | F01D 11/18 |
| 9,598,975 | B2 | 3/2017 | Uskert et al. | |
| 9,903,218 | B2 * | 2/2018 | Hafner | F01D 11/22 |
| 9,945,244 | B2 * | 4/2018 | Roberts | F01D 11/22 |
| 9,976,436 | B2 * | 5/2018 | Powell | F01D 11/20 |
| 10,316,685 | B2 * | 6/2019 | Davis | F01D 11/22 |
| 10,364,694 | B2 * | 7/2019 | Ribarov | F01D 5/12 |
| 10,370,999 | B2 * | 8/2019 | Blaney | F01D 11/20 |
| 10,371,008 | B2 * | 8/2019 | Sippel | F01D 11/122 |
| 10,378,387 | B2 * | 8/2019 | Baldiga | F01D 25/246 |
| 2004/0018084 | A1 * | 1/2004 | Halliwell | F01D 5/225 415/173.1 |
| 2005/0058540 | A1 * | 3/2005 | Diakunchak | F01D 11/18 415/173.1 |
| 2005/0238480 | A1 * | 10/2005 | Phipps | F01D 25/14 415/115 |
| 2007/0110564 | A1 * | 5/2007 | Leach | F01D 11/10 415/115 |
| 2008/0206046 | A1 * | 8/2008 | Razzell | F01D 11/005 415/173.1 |
| 2010/0034645 | A1 * | 2/2010 | Mulcaire | F01D 11/24 415/173.3 |
| 2010/0215477 | A1 * | 8/2010 | Wilson | F01D 21/003 415/118 |
| 2010/0232929 | A1 * | 9/2010 | Joe | F01D 9/04 415/1 |
| 2010/0313404 | A1 * | 12/2010 | Bates | F01D 11/22 29/402.01 |
| 2012/0063884 | A1 * | 3/2012 | Klingels | F01D 11/22 415/1 |
| 2012/0156007 | A1 * | 6/2012 | Bacic | F01D 11/20 415/126 |
| 2012/0263582 | A1 * | 10/2012 | Foster | F01D 25/246 415/182.1 |
| 2012/0275898 | A1 * | 11/2012 | McCaffrey | F01D 11/18 415/1 |
| 2013/0156550 | A1 * | 6/2013 | Franks | F01D 11/08 415/126 |
| 2013/0209240 | A1 * | 8/2013 | McCaffrey | F01D 11/22 415/173.2 |
| 2016/0053624 | A1 * | 2/2016 | McCaffrey | F01D 11/22 415/173.1 |
| 2016/0186596 | A1 * | 6/2016 | Tatman | F01D 25/246 415/1 |
| 2016/0186611 | A1 * | 6/2016 | Vetters | F01D 25/246 415/173.2 |
| 2016/0208635 | A1 * | 7/2016 | Vetters | F01D 11/12 |
| 2016/0273376 | A1 * | 9/2016 | Rioux | F01D 11/18 |
| 2016/0312643 | A1 * | 10/2016 | Davis | F01D 11/18 |
| 2017/0159487 | A1 * | 6/2017 | Stapleton | B28B 3/12 |
| 2018/0087400 | A1 * | 3/2018 | Quennehen | F01D 25/005 |
| 2018/0087405 | A1 * | 3/2018 | Quennehen | F01D 25/246 |

* cited by examiner

DUAL RESPONSE BLADE TRACK SYSTEM

TECHNICAL FIELD

This disclosure relates to gas turbine engines and, in particular, to blade track systems for gas turbine engines.

BACKGROUND

Gas turbine engines for aircraft include an engine, which drives a fan. The fan includes a number of radially extending fan blades mounted on a fan rotor enclosed by a fan casing. A fan track liner may be included within the casing around and adjacent the tips of the fan blades. The fan track liner can include panels which are designed to be cut or rubbed away by the blade tips.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example a blade track system may include an outer continuous ring, an inner continuous ring and a blade track. The outer continuous ring may be formed as a single monolithic structure to concentrically surround a hub of a gas turbine engine. The inner continuous ring may be formed as a single monolithic structure concentrically positioned within the outer continuous ring. The blade track may be fixedly coupled with the outer continuous ring. The inner continuous ring may be positioned between the outer continuous ring and the blade track and moveably maintained in concentric alignment with the outer continuous ring and the blade track by slots included in the inner continuous ring.

An interesting feature of the systems and methods described below may be that the outer ring radially expands and contracts at a first rate and the inner ring radially expands and contracts at a second rate that is less than the first rate. The blade track is coupled with the outer ring to radially expand at the first rate and radially contract at the second rate due to the outer ring being constrained to radially contract at the second rate.

Another interesting feature of the systems and methods described below may be that the outer continuous ring and the inner continuous ring are designed to cooperatively operate to minimize a distance between a tip of a turbine blade and the blade track during steady state conditions, cooperatively operate to move the blade track quickly away from the tip of the turbine blade during acceleration of the gas turbine engine, and move the blade track relatively slowly toward the tip of the turbine blade during deceleration of the gas turbine engine.

Still another interesting feature of the systems and methods described below is that the blade track system may be described as a dual response blade track system since it radially expands the segments of the blade track at a first predetermined rate according to the rate of response of the outer ring, and radially contracts the segment of the blade track at a second predetermined rate according to the rate of response of the inner ring.

Figure 1:
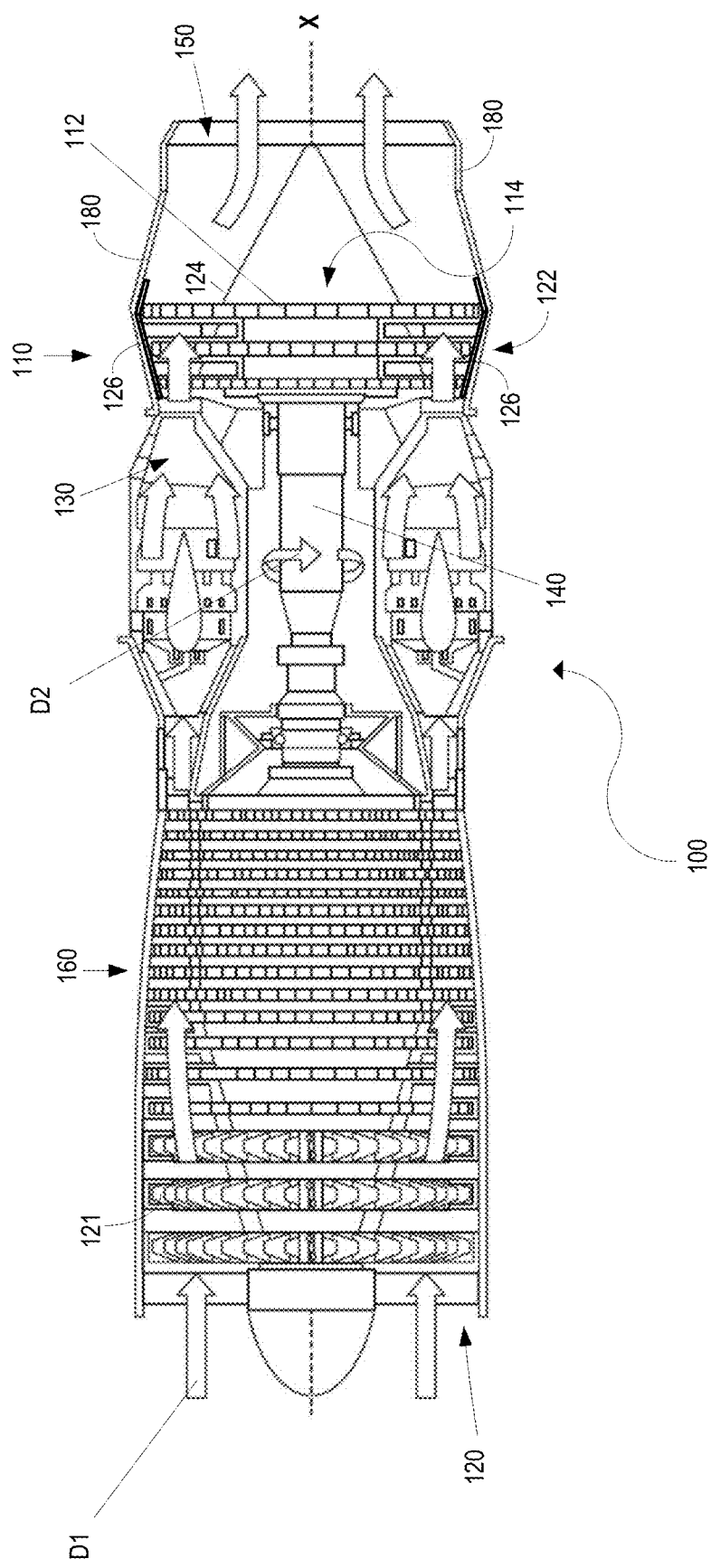
FIG. 1 is a cross-sectional view of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels in the direction D1 through blades 121 in the intake section 120. The fluid may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted previously, the hot, high pressure fluid passes through the turbine section 110 during operation of the gas turbine engine 100. As the fluid flows through the turbine section 110, the fluid passes between adjacent turbine blades 112 of the turbine 114 causing the turbine 114 to rotate. The rotating turbine 114 may turn a shaft 140 in a rotational direction D2, for example. The turbine blades 112 may rotate around an axis of rotation, which may correspond to a centerline X of the turbine 114 in some examples.

The turbine blades 112 may be distributed in an array of blades 122 circumferentially spaced around a hub 124 (or core or turbine spool) of the turbine 114. Circumferentially surrounding the array of blades 122 is a blade track system 126. The blade track system 126 is designed to track an outer edge or tip of turbine blades 112 included in the array of blades 122 as the blades 112 radially expand and contract, due to, for example, rotation of the hub 124 causing centrifugal force, and/or changes in temperature causing materials to expand and contract. Thus, as the diameter formed by the tips of the array of blades 122 expands and contracts, a blade track included in the blade track system 126 similarly expands and contracts to minimize rub of the tips of the blades 128 on the blade track under acceleration and deceleration operational conditions of the gas turbine.

During steady state operation of the gas turbine engine, the blade track may minimize clearance between the blade track and the tips of the turbine blades 122 to maximize efficiency. The blade track system 126 is a dual response blade track system since it responds with different rates of expansion and contraction to increases and decreases in temperature corresponding to acceleration and deceleration of the gas turbine engine. The different rates of expansion and contraction allow the blade track system 126 to more closely track dynamic radial expansion and contraction of the hub 124 and array of blades 122 than systems which have only a single response (e.g. expand and contract at the same rate when subject to changes in temperature due to acceleration and deceleration of the gas turbine engine).

Surrounding the blade track system 126 is the turbine casing 180. The blade track system 126 is positionable axially with the centerline X within the turbine casing 180 and radially outward of the turbine blades 112. The blade tracks included in the blade track system 126 may include a plurality of panels arranged circumferentially and axially along an inner surface of the turbine casing 180. The plurality of blade tracks may be cooperatively positioned to form a continuous barrier between the array of blades 122 and the turbine casing 180. The blade tracks may be dynamically radially moved outwardly and inwardly by the blade track system 126 in response to dynamic operation of the gas turbine engine 100 to avoid a rub of the tip of the turbine blades 112 on the segments of the blade tracks.

Figure 2:
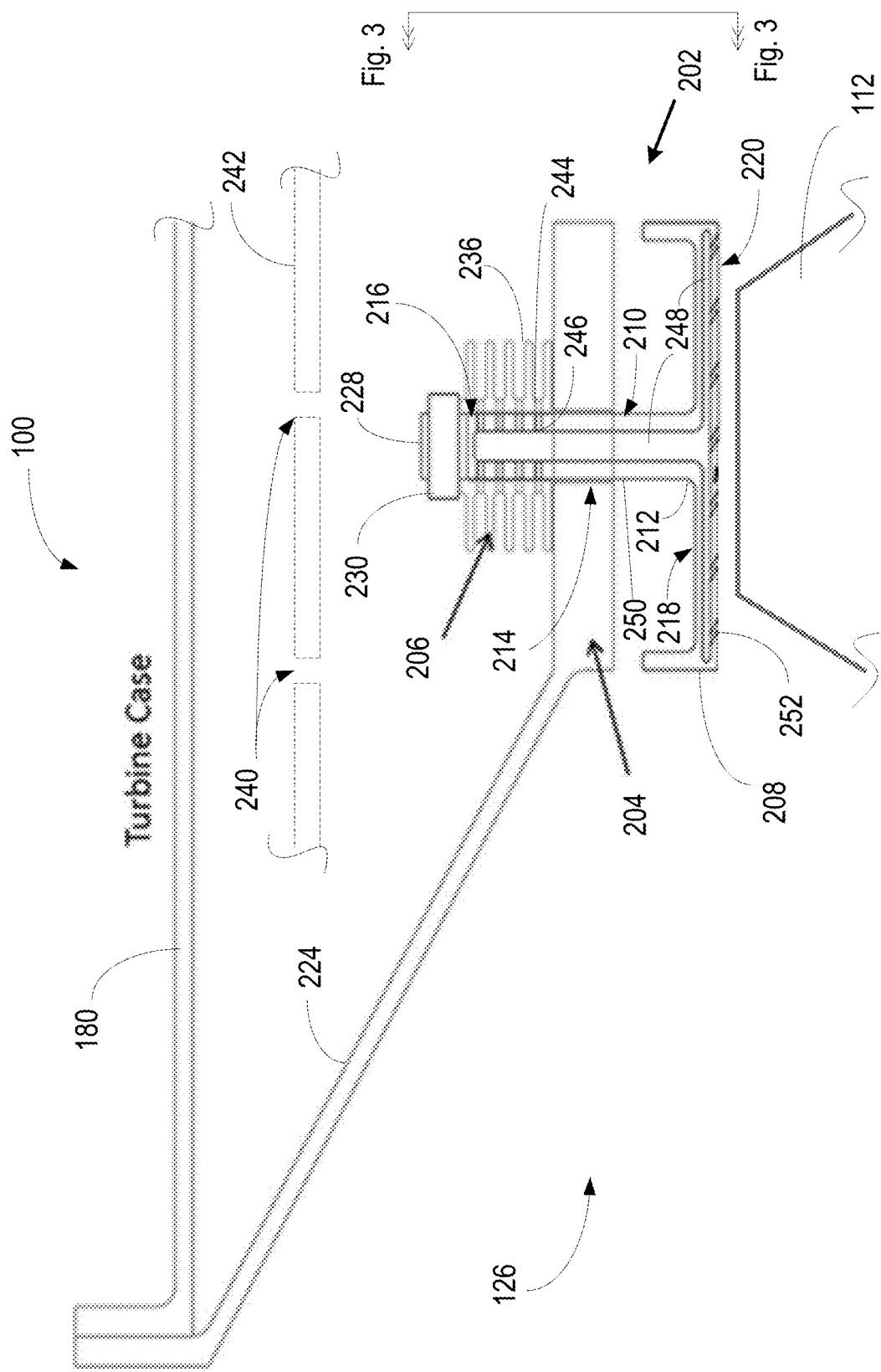
FIG. 2 is an enlarged cross-section of a portion of a gas turbine engine, that illustrates an example of the blade track system.

FIG. 2 is an enlarged cross-section of a portion of a gas turbine engine 100, that illustrates an example of the blade track system 126. The blade track system 126 includes a plurality of blade tracks 202, an inner ring 204 and an outer ring 206. In FIG. 2, only a single blade track 202 is illustrated adjacent a blade 128, although more are present in a gas turbine engine.

The blade track 202 includes a body 208 positioned concentrically at least partially within the inner ring 204, and at least one post 210. The post 210 may be coupled with the body 208 at a proximate end 212 of the post 210 and slidably extend through a slot 214 formed in the inner ring 204 and an aperture 216 formed in the outer ring 206 that is sized to receive the post 210. Alternatively, the body 208 may extend radially outward into the slot 214 included in the inner ring 204, and the proximate end 212 of the post 210 may be slidably positioned in the slot 214 and extend through the aperture 216 included in the outer ring 206.

The blade track 202 may be a casting of a nickel based superalloy such as MarM247 (equiaxed), CMSX-3 or CMSX-4 (single crystal). The body 208 of the blade track 202 may include an outboard surface 218 and an inboard surface 220 opposite the outboard surface 218 and facing towards the turbine hub (not shown). The outboard surface 218 may be formed to include the post 214, which extends perpendicularly away from the outboard surface 218. The inboard surface 220 may be formed as an abradable surface facing toward the blade 128 and the turbine hub such that the array of blades 122 (FIG. 1) extend radially outward from the turbine hub 124 (FIG. 1) toward the inboard surface 220.

The inner ring 204 may concentrically surround the turbine hub and the array of turbine blades to form a continuous ring, or hoop continuous member, positioned radially outward from at least part of the body 208 of the blade track 128. The body 208 or the post 210 may extend through the slot 214 included in inner ring 204, which is sized to allow slidable movement of the blade track 128. In an example, the slot 214 may be sized in the inner ring 204, such that two or more posts 204 included on the blade track 202 may be movably disposed in the slot 214 to allow for expansion and contraction. In another example, the slot 214 may be sized to receive a portion of the body 208 such that the blade track 202 is movably disposed in the slot 214 to allow for expansion and contraction The inner ring 204 may be fixedly coupled with the turbine case 180 by a strut 224 formed as part of the inner ring 204. The strut 224 may be coupled with the turbine case by welding, a fastener, or any other coupling mechanism.

The inner ring 204 may be formed to include a material that causes radial expansion and contraction as a function of temperature at a predetermined rate. The inner ring 204 may be formed as a monolithic structure. In an example, the inner ring 204 may be a single unitary casting or forging formed of a nickel based super alloy, such as INCONEL, or a poly crystalline super alloy such as equiaxed (EQ) MAR-M 247 alloy, or some other alloy capable of operation in the desired temperature and pressure ranges of the gas turbine engine that provides a predetermined rate of expansion and contraction. Thus, the inner ring 204 may be heated to radially expand from a first smaller diameter, to a second larger diameter at a predetermined rate. The inner ring 204 may be correspondingly radially cooled to contract from the second larger diameter to the first smaller diameter at the predetermined rate.

The outer ring 206 may be positioned radially outward from blade track 220 and the inner ring 204 and may be formed as a continuous ring, or hoop continuous member. The body 208 or the post 210 of the blade track 202 may extend through the slot 214 in the inner ring 204 and the post 210 may be fixedly coupled with the outer ring 206. The blade track 202 and the outer ring 206 may be maintained in concentric alignment with the inner ring 204 by the body 208 or the post 210, or the combination of the body 208 and the post 210. Thus, the inner ring 204 and outer ring 206 may be coupled with a cross-key arrangement provided by the body 208 and/or the post 210 such that the inner ring 204 and outer ring 206 may expand and contract at different rates while the blade track 202, the inner ring 204 and the outer ring 206 remain concentrically aligned.

The cross-key arrangement provided by the body 208 and/or the post(s) 210 of each of the blade tracks 202 is accomplished due to the post 210 being fixedly coupled with the body 208 and mechanically coupled with the outer ring 206, such that the body 208 and/or the post 210 movably extending through the slot 214 in the inner ring 204. In another example, the post 210 may be fixedly coupled to the outer ring 206 and mechanically coupled by a fastener with the blade track 202 such that the body 208 and/or the post 210 movably extending through the slot 214. In other examples, any other form of coupling may be used that allows for independent movement of the inner ring 204 with respect to the body 208 and the outer ring 206, such as due to contraction and expansion, while maintaining concentric alignment of blade tracks 202, the inner ring 204 and the outer ring 206.

A distal end 228 of the post 210 may be fixedly coupled with the outer ring 206 by, for example, a fastener 230 such as a nut engaged with threads formed on the distal end 228 of the post 210 to provide the fixed coupling. In other examples, welding, friction fit, snap fit, a pin, a clamp, or any other form of coupling mechanism may be used to fixedly hold and maintain the post 210 in contiguous contact with the outer ring 206.

The outer ring 206 may be formed to include a material that causes radial expansion and contraction as a function of temperature at a predetermined rate. The outer ring 206 may be formed as a monolithic structure. In an example, the outer ring 206 may be a single unitary forging or casting formed of a nickel based super alloy, such as a micro alloyed carbon steel forging such as an IN 909 forging, or an INCONEL alloy, such as an INCONEL 718 forging, or some other forging super alloy capable of operation in the desired temperature and pressure ranges of the gas turbine engine that provides a predetermined rate of expansion and contraction. Thus, the outer ring 206 may be heated to radially expand from a first smaller diameter, to a second larger diameter at a predetermined rate. The outer ring 206 may be correspondingly cooled to radially contract from the second larger diameter to the first smaller diameter.

The outer ring 206 may include a plurality of cooling fins 236 to increase a surface area of the outer ring 206. Cooling air, such as compressor discharge air from the last stage of the compressor section of the gas turbine engine, may be routed to the cooling fins 236. Features, such as channels, passageways, walls, vanes, and the like may be included in and/or around the blade track system 126 to direct the compressor discharge air to the cooling fins 236. In an example, compressor discharge air may be directed through vents 240 in an impingement plate 242 toward the cooling fins 236. In this example, the impingement plate 242 may be positioned in the turbine case 180 to receive the flow of compressor discharge air, and the vents 240 may be positioned to channel the compressor discharge air to the cooling fins 236.

The cooling fins 236 may include ducts 244 to receive and allow passage of a fluid, such as compressor discharge air, past the cooling fins 236 and into the ducts 244. The ducts 244 may be aligned to be in fluid communication with apertures 246, such as slots, included in the post 210. The apertures 246 are in fluid communication with an inner chamber 248 included in the post 210. The inner chamber 248 may be formed by an outer wall 250 of the blade track 202 and extend from the distal end 228 to the proximate end 212 of the post 210, and into the body 208. The apertures 246 may be formed in the outer wall 250 to provide fluid communication between the inner chamber 248 and the environment external to the blade track 202 via the ducts 244.

The environment external to and surrounding the blade track 202 also includes the turbine blades 112 and is exposed to the hot, high pressure fluid passing through the turbine section 110 during operation of the gas turbine engine 100, as discussed with reference to FIG. 1. Within the turbine case 180 the environment also surrounds the inner ring 204 and the outer ring 206. During operation, this environment is heated by the exhaust gases from the combustor of the gas turbine engine 100 and cooled by cooling fluid such as compressor discharge air. Accordingly, as the gas turbine engine 100 accelerates and decelerates, the temperature in the environment increases, and decrease correspondingly. While the gas turbine engine 100 is in substantially stable operation (e.g. not accelerating or decelerating) the temperature in the environment may remain substantially constant. The turbine blades 112, the blade track 202, the inner ring 204, and the outer ring 206 are subject to these variations in temperature within the environment.

Figure 3:
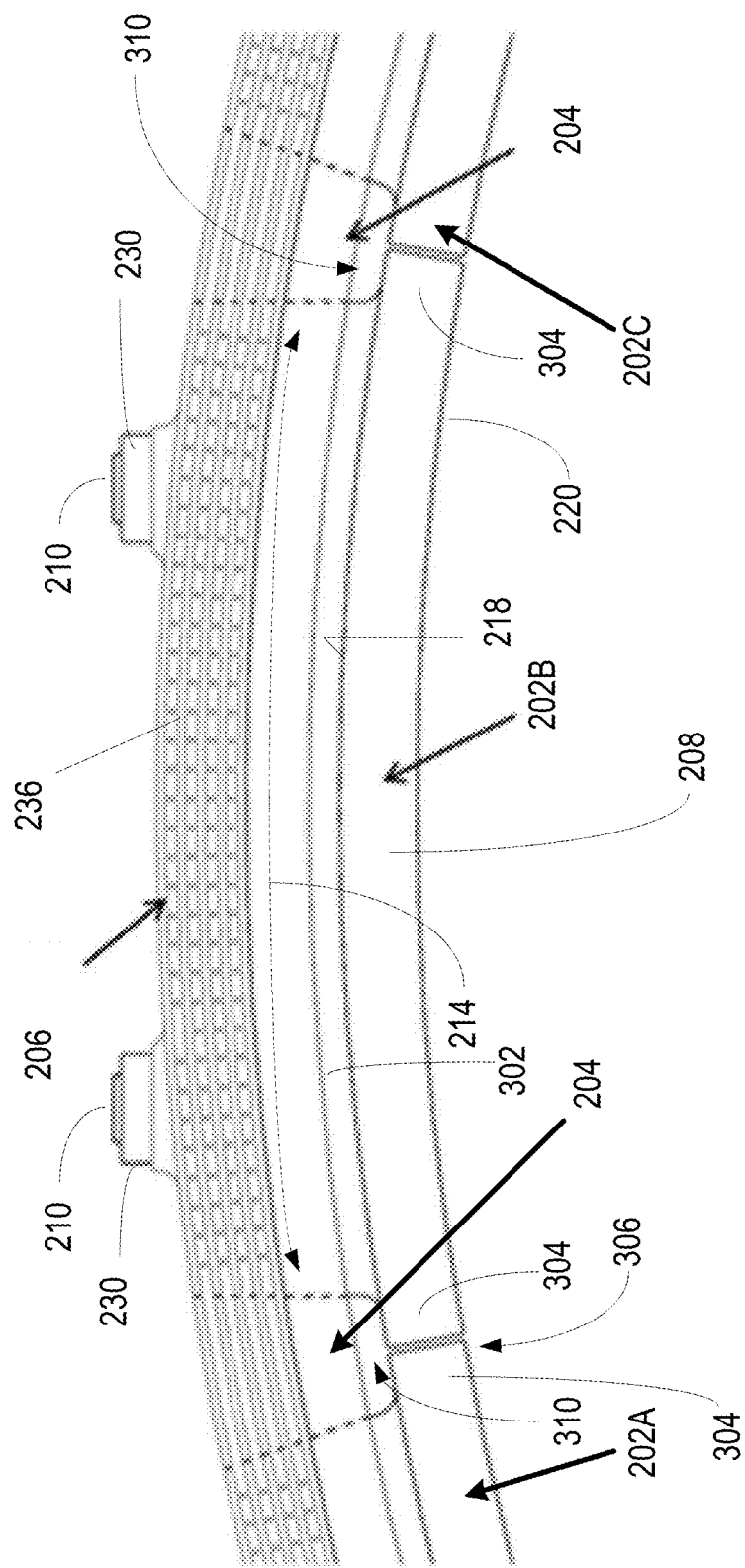
FIG. 3 is a cut-away side view of a portion of an example of the blade track system.

FIG. 3 is a cut-away side view of a portion of an example of the blade track system 126. In the example of FIG. 3, a number of segmented blade tracks 202 (202A, 202B and 202C) are illustrated as radially and sequentially positioned to surround the hub and array of blades (not shown). In the illustrated example, a portion 302 of the body 208 radially extends away and forms part of the outboard side 218 of each of the blade tracks 202. The portion 302 is positioned in the slot 214 formed in the inner ring 204. In this example, the slot 214 is sized to accommodate the radially extending portion 302 of the body 208.

Each segment of the illustrated blade track 202 includes two posts 210. In other examples one post, or three or more posts may be used. The proximate end of the posts 210 may extend out of the slot 214 from the outboard surface 218 of the radially extending portion 302 of the body 208 and be coupled with the outer ring 206 by fasteners 230. Alternatively, where the portion 302 of the body is absent, the posts 210 may extend through the slot 214 included in the inner ring 204 and be coupled with the outer ring 206 by fasteners 230. Each of the blade tracks 202 may include shoulders 304, which are contiguously contacting at a junction 306 and moveably radially aligned with shoulders 304 of sequentially neighboring blade tracks 202 such that a substantially continuous abradable surface of the inboard side 220 of the blade tracks 202 is presented and facing inboard toward the array of blades. At the junction 306 of the shoulders 304 on the outboard side of the blade track 202, an air space 310 is formed between the segments of the blade tracks 202.

As illustrated in the example of FIG. 3, the ducts 236 of the outer ring 206 which are outboard of the body 208 of the blade track 202 may perforate the outer ring to form an array or lattice of uniformly sized ducts 236. Above the air spaces 310, the ducts 236 may be formed as elongated slots as illustrated. The arrangement of the ducts 236 may provide optimized cooling and structural integrity of the outer ring 206.

Referring again to FIG. 2, fluid, such as compressor discharge air, or combustion air, received in the ducts 236 may cool the outer ring 206 and also be channeled through the slots 246 to the inner chamber 248 to cool the body 208. The body 208 may be cooled by fluid flowing within the inner chamber 248 and through vents 252 formed to penetrate the inboard surface 220. In some examples, the inner chamber 248 may include a pin fin array or other such feature(s) to increase the cooling surface area. In addition, the inboard surface 220 may include a thermal barrier coating (TBC) to withstand high temperatures due to the exhaust gases of the combustor. In an example, the maximum melt temperature of the thermal barrier coating may be up 1038 degrees Celsius (1900 degrees Fahrenheit). The temperature of the TBC coating may be maintained below the maximum melt temperature by cooling using the compressor discharge air via vents 252.

The blade track system 126 may respond to changes in temperature of the environment in which the blade track system 126 is located in order to minimize blade tip clearance during operating conditions of the gas turbine engine. For example, for a gas turbine engine operating in an aircraft, the blade track system 126 may minimize blade tip clearance during a steady state cruise condition. The blade tip clearance may be minimized during steady state cruise condition due the responsiveness of the blade track system 126 to changes in blade tip clearance during dynamic acceleration and deceleration conditions. The responsiveness of the blade track system 126 to changes in blade tip clearance is based on the response of the first ring 204 and the second ring 206 to changes in thermal operating conditions.

Due to the design of the inner ring 204 and the outer ring 206, the outer ring 206 responds more quickly to changes in temperature when compared to the designed response characteristic of the inner ring 204. Thus, during operation, of the blade track system 126, the diameter of outer ring 206 radially expands relatively quickly in response to an increase in temperature, such as due to acceleration of the gas turbine engine. Since the blade track 202 is coupled with the outer ring 206, the increase in diameter of the outer ring 206 correspondingly rapidly moves the segments of the blade track 202 radially outward away from the array of blades.

The inner ring 204 also radially expands in diameter, with a relatively slower response to the increase in temperature. Thus, if the temperature remains at the increased level, the diameter of the inner ring will eventually expand at a predetermined rate to the radially expanded diameter of the outer ring 206. Thus, the outer ring 206 and the inner ring 204 may be brought into contiguous contact due to the expansion in diameter of the inner ring 204 reaching the expanded diameter of the outer ring 206. Upon the temperature decreasing, such as during deceleration of the gas turbine engine, the outer ring 206 responds more quickly by radially contracting, however, radial contraction of the outer ring 206 is constrained, or impeded, by the contiguously contacting inner ring 204. Thus, the blade track 202 will radially contract at the predetermined rate of contraction of the inner ring 204. Since the blade track system 126 radially expands the segments of the blade track 202 at a first predetermined rate according to the rate of response of the outer ring 206, and radially contracts the segment of the blade track 202 at a second predetermined rate according to the rate of response of the inner ring 204, the system is a dual response blade track system.

The predetermined expansion and contraction rates and the predetermined contracted and expanded diameters of the inner ring 204 and the outer ring 206 may be specifically designed for the gas turbine engine in which the blade track system 126 is deployed. Expansion and contraction of the inner ring 204 and the outer ring 206 may also be based on the thermal expansion coefficient and the mass of the respective rings. The thermal expansion coefficient may be based on the materials used in the inner ring 204 and the outer ring 206, the area of the inner ring 204 and the outer ring 206, the heat transfer coefficient of the inner ring 204 and the outer ring 206, the expected range of temperature change in the environment where the inner and outer rings are positioned, and other variables. Based on these variables, the outer ring may be designed to radially expand at a predetermined rate that is faster than the radial expansion of the array of turbine blades, and the outer ring may be designed to radially contract at a predetermined rate that is slower than the contraction of the array of blades. In addition to the rate of expansion and contraction, the change in radial diameter between and expanded and a contracted state may also be designed such that an expanded diameter of the first and second rings, and a contracted diameter of the first and second rings may be predetermined and repeatable.

Figure 4:
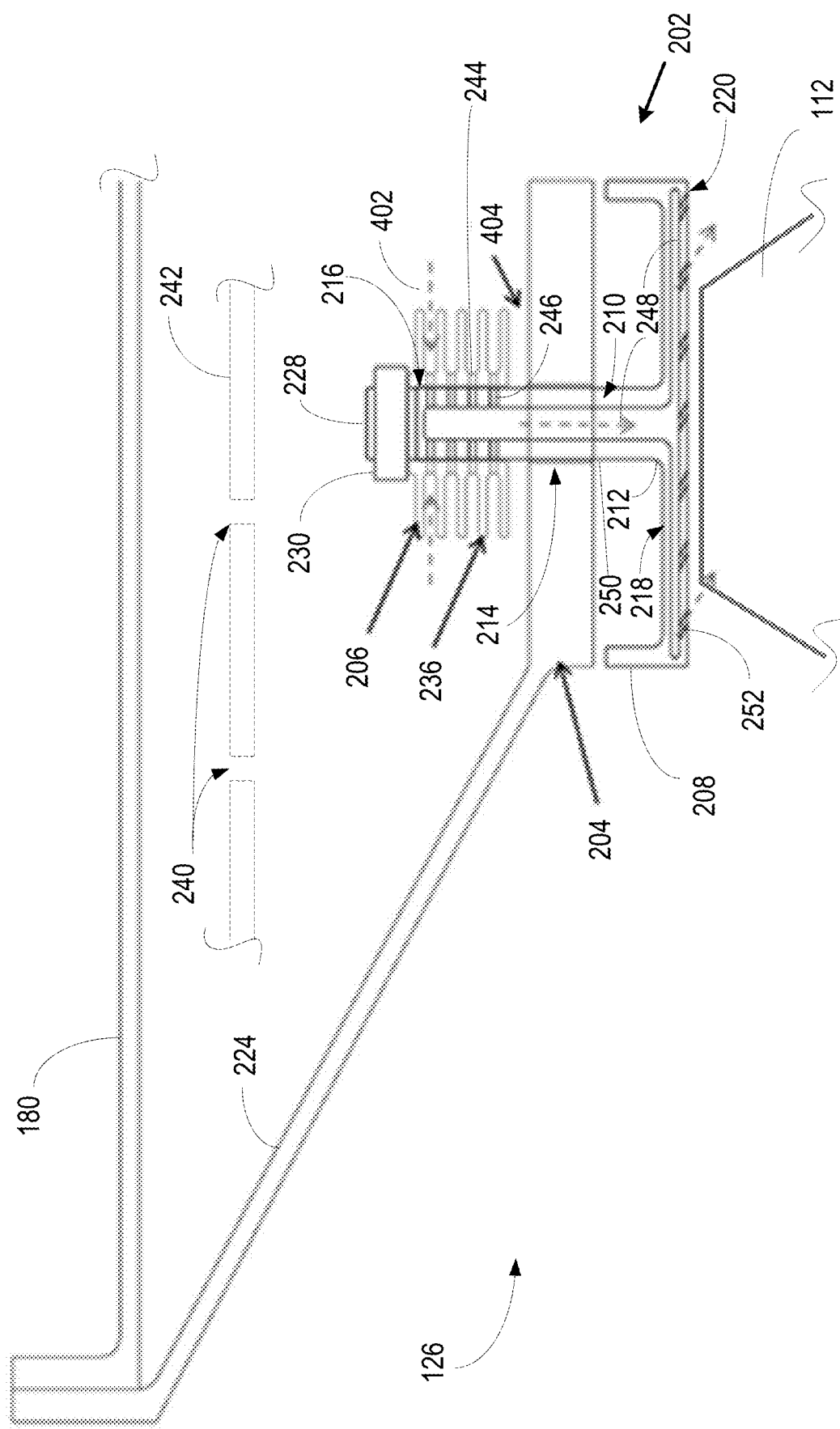
FIG. 4 is an enlarged cross-section of a portion of a gas turbine engine, that illustrates an example of the blade track system.

FIG. 4 is an enlarged cross-section of a portion of a gas turbine engine 100, that illustrates an example of the blade track system 126. The blade track system 126 of FIG. 4 may include all the functionality and features of the blade track system described with reference to FIGS. 1-3. In the example of FIG. 4, the temperature of the environment in which blade track system is located has recently been increased. Accordingly, the outer ring 206 is illustrated in a radially expanded diameter state when compared to a diameter of the outer ring 206 illustrated in FIG. 2 due to the outer ring responding to the increase in temperature. In FIG. 4, the inner ring 204 has not yet responded to the increase in temperature, thereby creating a gap 404 between the inner ring 204 and the outer ring 206, when compared to FIG. 2 where the inner ring 204 and the outer ring 206 are contiguous. Since the diameter of the outer ring 206 has concentrically and radially increased, the segments of the blade track 202 have correspondingly radially moved outward away from the hub of the gas turbine engine, and toward the inner ring 204.

After the inner ring 204 has responded to the increase in temperature, the diameter of the inner ring radially increases to close the gap 404 and contiguously align with the outer ring 206, without adjustment of the concentric radial position of the segments of the blade track 202. When the environment is decreased in temperature, such as by the introduction of compressor discharge air through the vents 240, into the cooling fins 236, through the chamber 248 and out through the vents 252 as illustrated by dotted arrows identified as 402, the blade track 202 radially contracts as the inner ring 204 and the outer ring radially contract at the same rate due to the contiguous alignment of the inner ring 204 and the outer ring 206. In other words, the radially contraction of the outer ring 206, which would otherwise be relatively quick is being delayed or constrained by the inner ring 204 which is radially contracting at a slower rate.

Figure 5:
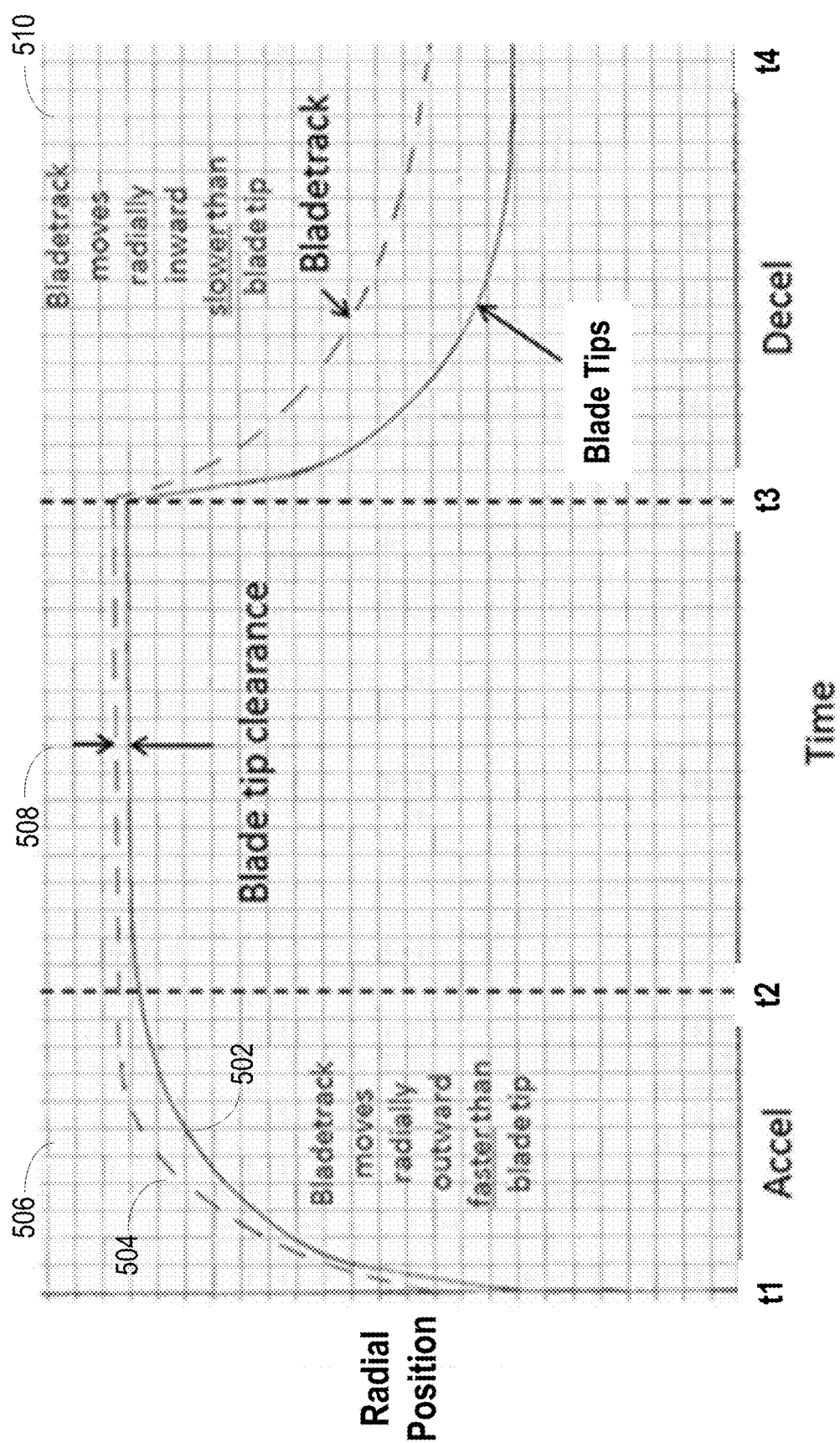
FIG. 5 is a timing diagram illustrating example responsive operation of the blade track system in a gas turbine engine of an aircraft.

FIG. 5 is a timing diagram illustrating example responsive operation of the blade track system 126 in a gas turbine engine of an aircraft. In FIG. 5, a radial position of the blade track 502 and a radial position of the array of blades 504 is illustrated during time (t) in a first phase of operation 506 of acceleration or a dynamic increase in combustion, a second phase of operation 508 of cruise or a substantially steady state combustion, and a third phase of operation of deceleration or a dynamic decrease in combustion. The response of the blade track system 126 is tailored to minimize the blade tip clearance during the second phase of operation 508—the steady state cruise condition. During the first phase of operation 506, the outer ring is designed to respond faster than the inner ring by channeling the cooling air past the array of fins.

Referring to FIGS. 1-5, during the first phase of operation 506, the gas turbine engine 100 is accelerating and the environment of the blade track system 126 is correspondingly increasing in temperature. Accordingly, the blade tips of the array of blades are radially expanding outwardly between time t1 and t2. Due to the quick radial expansion of the outer ring 206, the blade track 202 moves radially outward faster than the blade tips to avoid a rub between the blade tips and segments of the blade tracks 202. In addition, based on the design of the outer ring 206, the space between the blade tips and the blade track 202 may be minimized to optimize efficiency of the gas turbine engine in this regard. During the first phase of operation 506, the gap 404 is formed between the outer ring 206 and the inner ring 204 since the outer ring 206 has radially expanded to a larger predetermined diameter, and the inner ring 204 has not yet radially expanded.

During the second phase of operation 508 the temperature of the environment is relatively stable between time t2 and t3. The inner ring 204 grows radially outward to close the gap 404 by concentrically aligning in contiguous contact with the outer ring 206 at a predetermined radial diameter that minimizes the clearance between the tips of the blades and the blade track 202.

During the third phase of operation 510, the gas turbine engine 100 is decelerating and the tips of the blades are radially contracting toward the hub at a faster rate than the inner ring 204 is radially contracting so that the tips of the blades do not rub the blade track 202. The inner ring 204 restrains or impedes the outer ring 206 from moving quickly radially inward due to the contiguous contact. Thus, the blade track system 126 may be designed to allow the blade track to move quickly outward during an acceleration phase and slow the inward motion of the blade track during a deceleration phase to prevent blade tip rubs during these conditions. In addition, due to the improved control of the position of the blade track 202, tighter tip clearances, such as during cruise phase are possible. The material and geometry of the inner and outer rings 204 and 206 may be designed to obtain the desired response rates in order to minimize rubs and cruise blade tip clearance.

Figure 6:
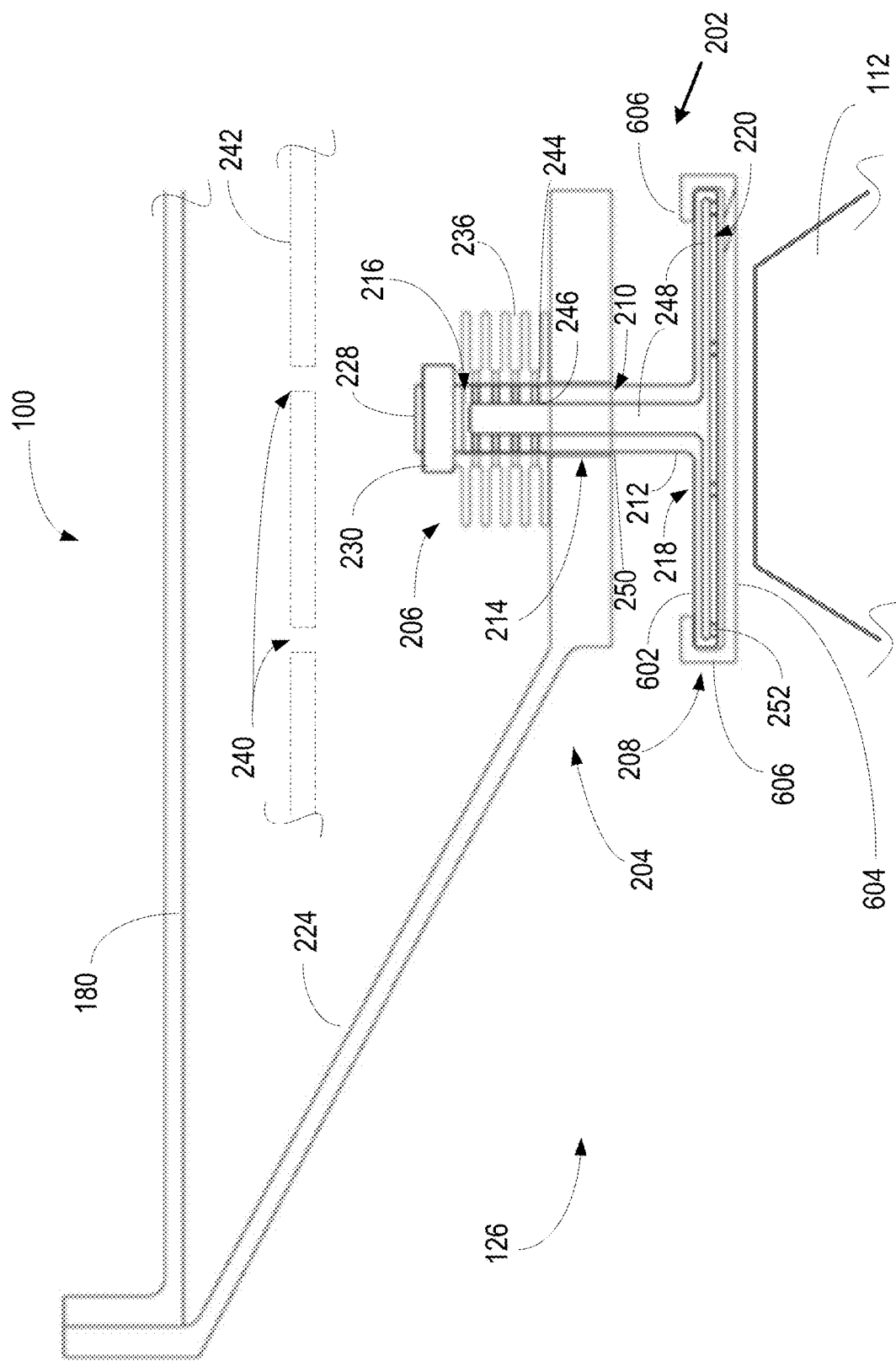
FIG. 6 is an enlarged cross-section of a portion of a gas turbine engine, that illustrates an example of the blade track system.

FIG. 6 is an enlarged cross-section of a portion of a gas turbine engine 100, that illustrates an example of the blade track system 126. The blade track system 126 of FIG. 6 may include all the functionality and features of the blade track system 126 described with reference to FIGS. 1-5. Thus, for purposes of brevity, the discussion will not be repeated. In the example of FIG. 6, the body 208 of the blade track 202 may be a multiple part assembly, to enable various materials to be used for the portion of the blade track section in the flow path of the combustion gases.

In the example of FIG. 6, the body 208 includes a core 602 and a barrier 604. The core 602 may be a casting such as nickel based super alloy that includes the interior chamber 248 and the vents 252. The barrier 604 may be a high temperature rigid material such as high temperature ceramic matrix composite (CMC) which may be formed to enclose the inboard surface 220 of the body 208. In this configuration, an outer surface of the barrier 604 may be exposed to the hot combustion gases, and the vents 252 may provide cooling air to an inner surface of the barrier 604. The barrier 604 may be formed with ears 606 such that a barrier 604 may be snapped on or slide on to each segment of the blade track 202.

Since the barrier 604 is capable of withstanding high temperature environments, such as maximum melt temperatures of 1538 Celsius (2800 Degrees Fahrenheit), the cooling air requirements for the blade track 202 may be reduced. Thus, the gas turbine engine may be operated more efficiently since lesser amounts, or lower volume, of the compressor discharge air are being diverted away from the combustor and through the vents 252.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A blade track system comprising:
   a blade track for a gas turbine engine, the blade track comprising an outboard surface and an inboard surface, the outboard surface formed to include a post extending away from the outboard surface, and an inboard surface formed as an abradable surface positioned opposite the outboard surface to face a turbine hub of a gas turbine engine, the turbine hub having a plurality of blades extending radially outward toward the abradable surface;
   a first continuous ring positioned radially outward from the blade track and formed to surround the turbine hub, the post coupled with the first continuous ring; and
   a second continuous ring radially outward from the blade track, radially inward from the first continuous ring, and formed to surround the turbine hub, at least one of the post or a portion of the blade track extending through a slot included in the second continuous ring.

2. The blade track system of aspect 1, wherein the first continuous ring is formed to include a material that causes radial expansion and contraction as a function of temperature at a first rate, and the second continuous ring configured is formed to include a material that causes radial expansion and contraction as a function of temperature at a second rate, the second rate being less than the first rate.

3. The blade track system of aspect 1 or 2, wherein the first continuous ring includes a plurality of cooling fins.

4. The blade track system of any of aspects 1-3, wherein the post includes a proximate end at an outboard surface of the second continuous ring, a distal end couple with the first continuous ring, and an inner chamber formed to extend from the proximate end to the distal end and into a body of the blade track.

5. The blade track system of aspect 4, wherein the post is formed to include a plurality of apertures proximate the distal end, the apertures extending through an outer wall of the post to provide fluid communication between the inner chamber and an environment external to the post.

6. The blade track system of aspect 5, wherein the first continuous ring includes a plurality of cooling fins, the cooling fins arranged to form a plurality of enclosed ducts positioned on the outer wall of the post in alignment with the apertures to channel a flow of fluid to the apertures.

7. The blade track system as in any of aspects 1-6, wherein at least one of the post or the portion of the blade track is slidable in the slot, and the first continuous ring and the second continuous ring independently fluctuate in diameter to be spaced away or in contiguous contact while remaining concentrically aligned by at least one of the post or the portion of the blade track.

8. A method comprising:
   heating a first continuous ring with exhaust gases of a gas turbine engine to expand the first continuous ring from a first diameter to a second diameter at a first predetermined rate;
   moving a blade track coupled with the first continuous ring radially outward away from a gas turbine engine hub toward a second continuous ring concentrically positioned between the blade track and the first continuous ring;
   heating the second continuous ring to expand a diameter of the second continuous ring at a second predetermined rate toward the first continuous ring, the first predetermined rate being greater than the second predetermined rate; and cooling the first continuous ring and the second continuous ring to contract the diameter of the first continuous ring and the diameter of the second continuous ring at a same rate of contraction, the first continuous ring being in contiguous contact with the second continuous ring during the cooling.

9. The method of aspect 8, wherein the same rate of contraction is equal to the second predetermined rate.

10. The method of aspect 9, wherein heating the first continuous ring comprises subjecting a plurality of cooling fins included in the first continuous ring to compressor discharge air of the gas turbine engine.

11. The method of aspect 10, wherein heating the first continuous ring comprises directing the compressor discharge air to the blade track via a plurality of enclosed ducts formed by the cooling fins.

12. The method as in any of aspects 8-11, wherein heating the first continuous ring comprises separating the first continuous ring away from contiguous contact with the second continuous ring to form a gap therebetween.

13. The method of aspect 12, wherein heating the second continuous ring comprises closing the gap between the first continuous ring and the second continuous ring to contiguously align the first continuous ring and the second continuous ring.

14. The method of any of aspects 8-13, further comprising maintaining, by the blade track, the first continuous ring and the second continuous ring in concentric alignment.

15. The method of aspect 14, further comprising restricting lateral and rotational movement of the second continuous ring with a post included in the blade track, the post slidably extending through a slot formed in the second continuous ring and fixedly coupled with the first continuous ring.

16. The method of aspect 15, further comprising fixedly coupling the post with the first continuous ring by a fastener.

17. A blade track system comprising:

an outer continuous ring, the outer continuous ring formed as a single monolithic structure to concentrically surround a hub of a gas turbine engine;

an inner continuous ring, the inner continuous ring formed as a single monolithic structure concentrically positioned within the outer continuous ring; and a blade track fixedly coupled with the outer continuous ring, the inner continuous ring positioned between the outer continuous ring and the blade track and moveably maintained in concentric alignment with the outer continuous ring and the blade track by slots included in the inner continuous ring.

18. The blade track system of aspect 17, wherein the blade track includes a body comprising a core and a barrier, wherein the core is configured to supply compressor cooling air to the barrier, and the barrier is a ceramic matrix composite material.

19. The blade track system as in aspect 17 or 18, wherein the outer continuous ring expands and contracts at a first predetermined rate, and the inner continuous ring expands and contracts at a second predetermined rate, the first predetermined rate being greater than the second predetermined rate.

20. The blade track system as in any of aspects 17-19, wherein the outer continuous ring includes a plurality of cooling fins positioned to receive compressor discharge air generated by the gas turbine and channeled to the outer continuous ring, the compressor discharge air channeled through a duct included in the cooling fins to an inner chamber of the blade track.

What is claimed is:

1. A blade track system comprising:
a blade track for a gas turbine engine, the blade track comprising an outboard surface and an inboard surface, the outboard surface including a post extending away from the outboard surface, and an inboard surface formed as an abradable surface positioned opposite the outboard surface to face a turbine hub of a gas turbine engine, the turbine hub having a plurality of blades extending radially outward toward the abradable surface;
a first continuous ring positioned radially outward from the blade track and surrounding the turbine hub, the blade track fixedly coupled with the first continuous ring by the post; and
a second continuous ring radially outward from the blade track, radially inward from the first continuous ring, and formed to surround the turbine hub, at least one of the post or a portion of the blade track extending through a slot included in the second continuous ring, the slot sized for slideable movement in the slot of the at least one of the post or the portion of the blade track with respect to the second continuous ring.

2. The blade track system of claim 1, wherein the first continuous ring is formed to include a material that causes radial expansion and contraction as a function of temperature at a first rate, and the second continuous ring configured to include a material that causes radial expansion and contraction as a function of temperature at a second rate, the second rate being less than the first rate.

3. The blade track system of claim 1, wherein the first continuous ring includes a plurality of cooling fins.

4. A blade track system comprising:
a blade track for a gas turbine engine, the blade track comprising an outboard surface and an inboard surface, the outboard surface formed to include a post extending away from the outboard surface, and an inboard surface formed as an abradable surface positioned opposite the outboard surface to face a turbine hub of a gas turbine engine, the turbine hub having a plurality of blades extending radially outward toward the abradable surface;
a first continuous ring positioned radially outward from the blade track and formed to surround the turbine hub, the post coupled with the first continuous ring; and a second continuous ring radially outward from the blade track, radially inward from the first continuous ring, and formed to surround the turbine hub, at least one of the post or a portion of the blade track extending through a slot included in the second continuous ring, wherein the post includes a proximate end at an outboard surface of the second continuous ring, a distal end couple with the first continuous ring, and an inner chamber formed to extend from the proximate end to the distal end and into a body of the blade track.

5. The blade track system of claim 4, wherein the post is formed to include a plurality of apertures proximate the distal end, the apertures extending through an outer wall of the post to provide fluid communication between the inner chamber and an environment external to the post.

6. The blade track system of claim 5, wherein the first continuous ring includes a plurality of cooling fins, the cooling fins arranged to form a plurality of enclosed ducts positioned on the outer wall of the post in alignment with the apertures to channel a flow of fluid to the apertures.

7. The blade track system of claim 1, wherein the first continuous ring and the second continuous ring independently fluctuate in diameter to be spaced away or in contiguous contact while remaining concentrically aligned by at least one of the post or the portion of the blade track.

8. A method comprising:
heating a first continuous ring with exhaust gases of a gas turbine engine to expand the first continuous ring from a first diameter to a second diameter at a first predetermined rate;
moving a blade track coupled via a post with the first continuous ring radially outward away from a gas turbine engine hub toward a second continuous ring concentrically positioned between the blade track and the first continuous ring, the post slidable in a slot included in the second continuous ring to move the blade track toward the second continuous ring;
heating the second continuous ring to expand a diameter of the second continuous ring at a second predetermined rate toward the first continuous ring, the first predetermined rate being greater than the second predetermined rate; and
cooling the first continuous ring and the second continuous ring to contract the diameter of the first continuous ring and the diameter of the second continuous ring at a same rate of contraction, the first continuous ring being in contiguous contact with the second continuous ring during the cooling.

9. The method of claim 8, wherein the same rate of contraction is equal to the second predetermined rate.

10. The method of claim 9, wherein heating the first continuous ring comprises subjecting a plurality of cooling fins included in the first continuous ring to compressor discharge air of the gas turbine engine.

11. The method of claim 10, wherein heating the first continuous ring comprises directing the compressor discharge air to the blade track via a plurality of enclosed ducts formed by the cooling fins.

12. The method of claim 8, wherein heating the first continuous ring comprises separating the first continuous ring away from contiguous contact with the second continuous ring to form a gap therebetween.

13. The method of claim 12, wherein heating the second continuous ring comprises closing the gap between the first continuous ring and the second continuous ring to contiguously align the first continuous ring and the second continuous ring.

14. The method of claim 8, further comprising maintaining, by the blade track, the first continuous ring and the second continuous ring in concentric alignment.

15. The method of claim 14, further comprising restricting lateral and rotational movement of the second continuous ring with the post included in the blade track, the post slidably extending through the slot formed in the second continuous ring and fixedly coupled with the first continuous ring.

16. The method of claim 15, further comprising fixedly coupling the post with the first continuous ring by a fastener.

17. A blade track system comprising:
an outer continuous ring, the outer continuous ring being a single monolithic structure is concentrically surrounding a hub of a gas turbine engine;
an inner continuous ring, the inner continuous ring being a single monolithic structure concentrically positioned within the outer continuous ring; and
a blade track fixedly coupled with the outer continuous ring by a post, the inner continuous ring positioned between the outer continuous ring and the blade track and moveably maintained in concentric alignment with the outer continuous ring and the blade track by the post, the post being slidable in a slot included in the inner continuous ring.

18. The blade track system of claim 17, wherein the blade track includes a body comprising a core and a barrier, wherein the core is configured to supply compressor cooling air to the barrier, and the barrier is a ceramic matrix composite material.

19. The blade track system of claim 17, wherein the outer continuous ring expands and contracts at a first predetermined rate, and the inner continuous ring expands and contracts at a second predetermined rate, the first predetermined rate being greater than the second predetermined rate.

20. The blade track system of claim 17, wherein the outer continuous ring includes a plurality of cooling fins positioned to receive compressor discharge air generated by the gas turbine and channeled to the outer continuous ring, the compressor discharge air channeled through a duct included in the cooling fins to an inner chamber of the blade track.

* * * * *